US010082559B1

(12) United States Patent
Saxon

(10) Patent No.: US 10,082,559 B1
(45) Date of Patent: Sep. 25, 2018

(54) PCI CELL RESTRICTION AND COARSE GEOMETRY

(71) Applicant: Nokia Technologies Oy, Espoo (FI)

(72) Inventor: Robert Saxon, Fox River Grove, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/712,840

(22) Filed: Sep. 22, 2017

(51) Int. Cl.
| | |
|---|---|
| *H04W 24/00* | (2009.01) |
| *G01S 5/14* | (2006.01) |
| *H04B 17/27* | (2015.01) |
| *G01S 1/08* | (2006.01) |
| *G01S 5/02* | (2010.01) |
| *H04W 4/021* | (2018.01) |

(52) U.S. Cl.
CPC .................... *G01S 5/14* (2013.01); *G01S 1/08* (2013.01); *G01S 5/0273* (2013.01); *H04B 17/27* (2015.01); *H04W 4/021* (2013.01)

(58) Field of Classification Search
CPC ........... G01S 5/14; G01S 1/08; G01S 5/0273; H04W 4/021; H04B 17/27
See application file for complete search history.

(56) References Cited

U.S. PATENT DOCUMENTS

| | | | | |
|---|---|---|---|---|
| 8,903,415 | B2* | 12/2014 | Kazmi ................ | H04W 64/00 455/443 |
| 9,037,163 | B2* | 5/2015 | Tenny ................ | H04W 56/00 370/331 |
| 9,961,680 | B2* | 5/2018 | Lim ................ | H04W 72/0446 |
| 2013/0122930 | A1* | 5/2013 | Woo ...................... | G01S 5/0205 455/456.1 |
| 2016/0205651 | A1* | 7/2016 | Isa ........................ | H04W 4/70 455/456.1 |

OTHER PUBLICATIONS

3GPP TS 36.355 V14.2.0 (Jun. 2017).*
3GPP TS 36.355 Version 10.0.0 Release 10 *LTE; Evolved Universal Terrestrial Radio Access (E-UTRA); LTE Positioning Protocol (LPP)* ETSI TS 136 355 V10.0.0. pp. 1-115 (Jan. 2011).

* cited by examiner

*Primary Examiner* — William Nealon
(74) *Attorney, Agent, or Firm* — Harrington & Smith

(57) ABSTRACT

A method is provided including receiving, by a user equipment connected to a serving cell of a wireless network, assistance data for performing measurements of positioning reference signals, wherein the assistance data comprises reference cell information for a reference cell, and neighbor cell information for one or more neighbor cells; in response to determining that the reference cell information comprises an indication that the user equipment is not to measure a positioning reference signal of the reference cell, selecting one of the neighbor cells as a new reference cell; and performing measurements of the positioning reference signals based on one or more of the remaining neighbor cells in the assistance data.

20 Claims, 7 Drawing Sheets

```
-- ASN1START

OTDOA-ReferenceCellInfo ::= SEQUENCE {
    physCellId              INTEGER (0..503),
    cellGlobalId            ECGI                                            OPTIONAL,  -- Need ON
    earfcnRef               ARFCN-ValueEUTRA                                OPTIONAL,  -- Cond NotSameAsServ0
    antennaPortConfig       ENUMERATED {ports1-or-2, ports4, ...}           OPTIONAL,
    cpLength                ENUMERATED { normal, extended, ...},
    prsInfo                 PRS-Info                                        OPTIONAL,  -- Cond PRS
    ...,
    [[ earfcnRef-v9a0       ARFCN-ValueEUTRA-v9a0                           OPTIONAL   -- Cond NotSameAsServ2
    ]]
    do_not_use              INTEGER (0..1)                                  OPTIONAL,  -- Cond Do not use this PCI
    coarse_X_UE_Offset      INTEGER (0..2048),                              OPTIONAL,  -- Cond Reference do_not_use is defined
    coarse_Y_UE_Offset      INTEGER (0..2048),                              OPTIONAL,  -- Cond Reference do_not_use is defined
}

-- ASN1STOP
```

```
OTDOA-NeighbourCellInfoElement ::= SEQUENCE {
    physCellId              INTEGER (0..503),
    cellGlobalId            ECGI                                    OPTIONAL,   -- Need ON
    earfcn                  ARFCN-ValueEUTRA,                       OPTIONAL,   -- Cond NotSameAsRef0
    cpLength                ENUMERATED {normal, extended, ...},
    prsInfo                 PRS-Info                                OPTIONAL,   -- Cond NotSameAsRef1
    antennaPortConfig       ENUMERATED {ports-1-or-2, ports-4, ...},OPTIONAL,   -- Cond NotSameAsRef2
    slotNumberOffset        INTEGER (0..19)                         OPTIONAL,   -- Cond NotsameAsRef3
    prs-SubframeOffset      INTEGER (0..1279)                       OPTIONAL,   -- Cond NotSameAsRef4
    expectedRSTD            INTEGER (0..16383),                     OPTIONAL,   -- Cond InterFreq
    expectedRSTD-Uncertainty INTEGER (0..1023),                     OPTIONAL,   -- Cond Reference do_not_use is NOT defined
    coarse_X_Ref_Offset     INTEGER (0..2048),                      OPTIONAL,   -- Cond Reference do_not_use is NOT defined
    coarse_Y_Ref_Offset     INTEGER (0..2048),                      OPTIONAL,   -- Cond Reference do_not_use is defined
    ...,
    [[ earfcn-v9a0          ARFCN-ValueEUTRA-v9a0                   OPTIONAL    -- Cond NotSameAsRef5
    ]]
}
```

FIG. 5

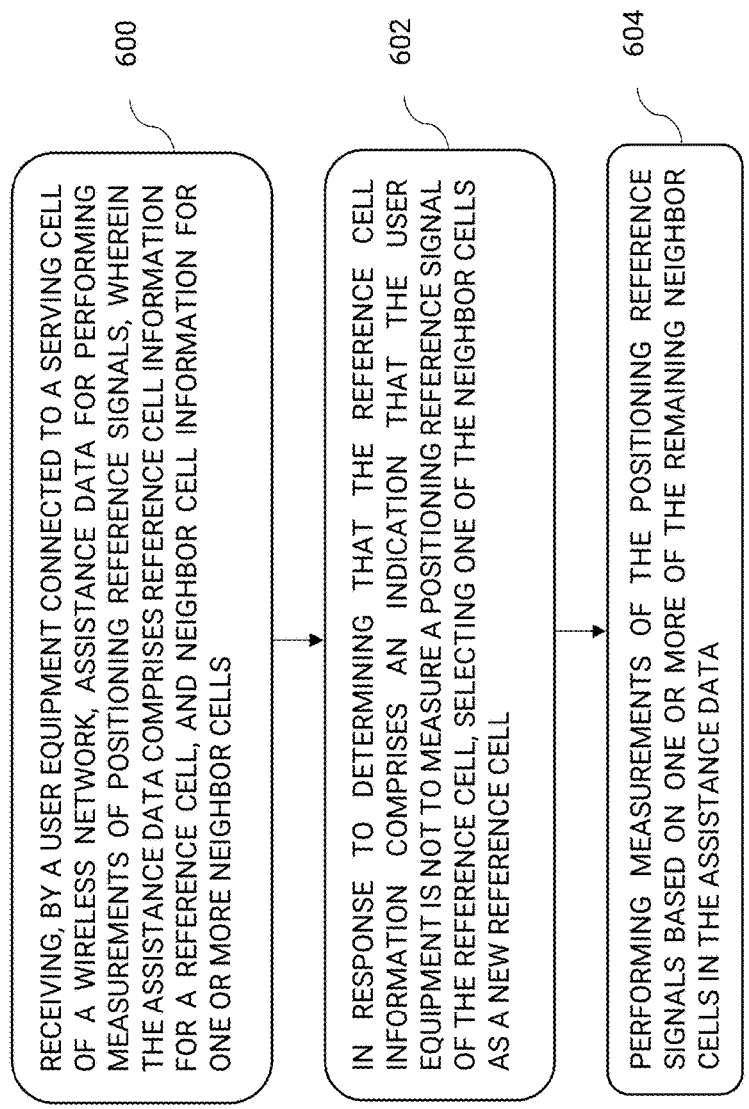

FIG. 6

600 — RECEIVING, BY A USER EQUIPMENT CONNECTED TO A SERVING CELL OF A WIRELESS NETWORK, ASSISTANCE DATA FOR PERFORMING MEASUREMENTS OF POSITIONING REFERENCE SIGNALS, WHEREIN THE ASSISTANCE DATA COMPRISES REFERENCE CELL INFORMATION FOR A REFERENCE CELL, AND NEIGHBOR CELL INFORMATION FOR ONE OR MORE NEIGHBOR CELLS

602 — IN RESPONSE TO DETERMINING THAT THE REFERENCE CELL INFORMATION COMPRISES AN INDICATION THAT THE USER EQUIPMENT IS NOT TO MEASURE A POSITIONING REFERENCE SIGNAL OF THE REFERENCE CELL, SELECTING ONE OF THE NEIGHBOR CELLS AS A NEW REFERENCE CELL

604 — PERFORMING MEASUREMENTS OF THE POSITIONING REFERENCE SIGNALS BASED ON ONE OR MORE OF THE REMAINING NEIGHBOR CELLS IN THE ASSISTANCE DATA

PCI CELL RESTRICTION AND COARSE GEOMETRY

TECHNICAL FIELD

This invention relates generally to wireless communication systems and, more specifically, relates to positioning protocols in wireless communication systems.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

Geographic positioning of mobile terminals is used for various purposes, such as emergency calls for first responders for example. Often times, a mobile terminal's geographic positioning can be determined through a global positioning system (GPS). However, there are times when GPS is unable to determine the location of a mobile terminal accurately such as when there is a lack of clear line of sight. Further, not every mobile terminal has a GPS capability. In these cases, a wireless network may provide assistance so that the mobile terminal may accurately determine its geographic position. Observed time difference of arrival (OTDOA) positioning is one solution which uses signal from neighbor cells to calculate an observed time different of arrival relative to the service cell (or another designated reference cell) of the mobile terminal. LTE LPP specification 3GPP TS 36.355 provides details on OTDOA positioning.

BRIEF SUMMARY

This section is intended to include examples and is not intended to be limiting.

In an example of an embodiment, a method is disclosed that includes receiving, by a user equipment connected to a serving cell of a wireless network, assistance data for performing measurements of positioning reference signals, wherein the assistance data comprises reference cell information for a reference cell, and neighbor cell information for one or more neighbor cells; in response to determining that the reference cell information comprises an indication that the user equipment is not to measure a positioning reference signal of the reference cell, selecting one of the neighbor cells as a new reference cell; and performing measurements of the positioning reference signals based on one or more of the remaining neighbor cells in the assistance data.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: receiving, by a user equipment connected to a serving cell of a wireless network, assistance data for performing measurements of positioning reference signals, wherein the assistance data comprises reference cell information for a reference cell, and neighbor cell information for one or more neighbor cells; in response to determining that the reference cell information comprises an indication that the user equipment is not to measure a positioning reference signal of the reference cell, selecting one of the neighbor cells as a new reference cell; and performing measurements of the positioning reference signals based on one or more of the remaining neighbor cells in the assistance data.

BRIEF DESCRIPTION OF THE DRAWINGS

In the attached Drawing Figures:

FIG. 4 is an non-limiting example of a reference cell information element in accordance with exemplary embodiments;

FIG. 5 is a non-limiting example of a neighbor cell information element in accordance with exemplary embodiments; and FIGS. 6 and 7 are logic flow diagrams for PCI Cell Restriction and Coarse Geometry, and illustrate the operation of an exemplary method, a result of execution of computer program instructions embodied on a computer readable memory, functions performed by logic implemented in hardware, and/or interconnected means for performing functions in accordance with exemplary embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Although the description below occasionally refers to LTE terms, these terms are equally applicable to other wireless networks unless indicated otherwise. For example, the term eNB is also applicable to a gNB of a 5G wireless system.

The exemplary embodiments herein describe techniques for PCI cell restriction and coarse geometry. Additional description of these techniques is presented after a system into which the exemplary embodiments may be used is described. A physical cell identifier is a specific number assigned to a cell.

Generally, the term "PCI" and "cell" are used interchangeably herein, unless the context indicates otherwise. A neighbor list includes a list of cells and each cell has a PCI value. The phrase "select a cell"; "select a neighbor"; or "select a PCI" refers to the same operation.

Figure 1:
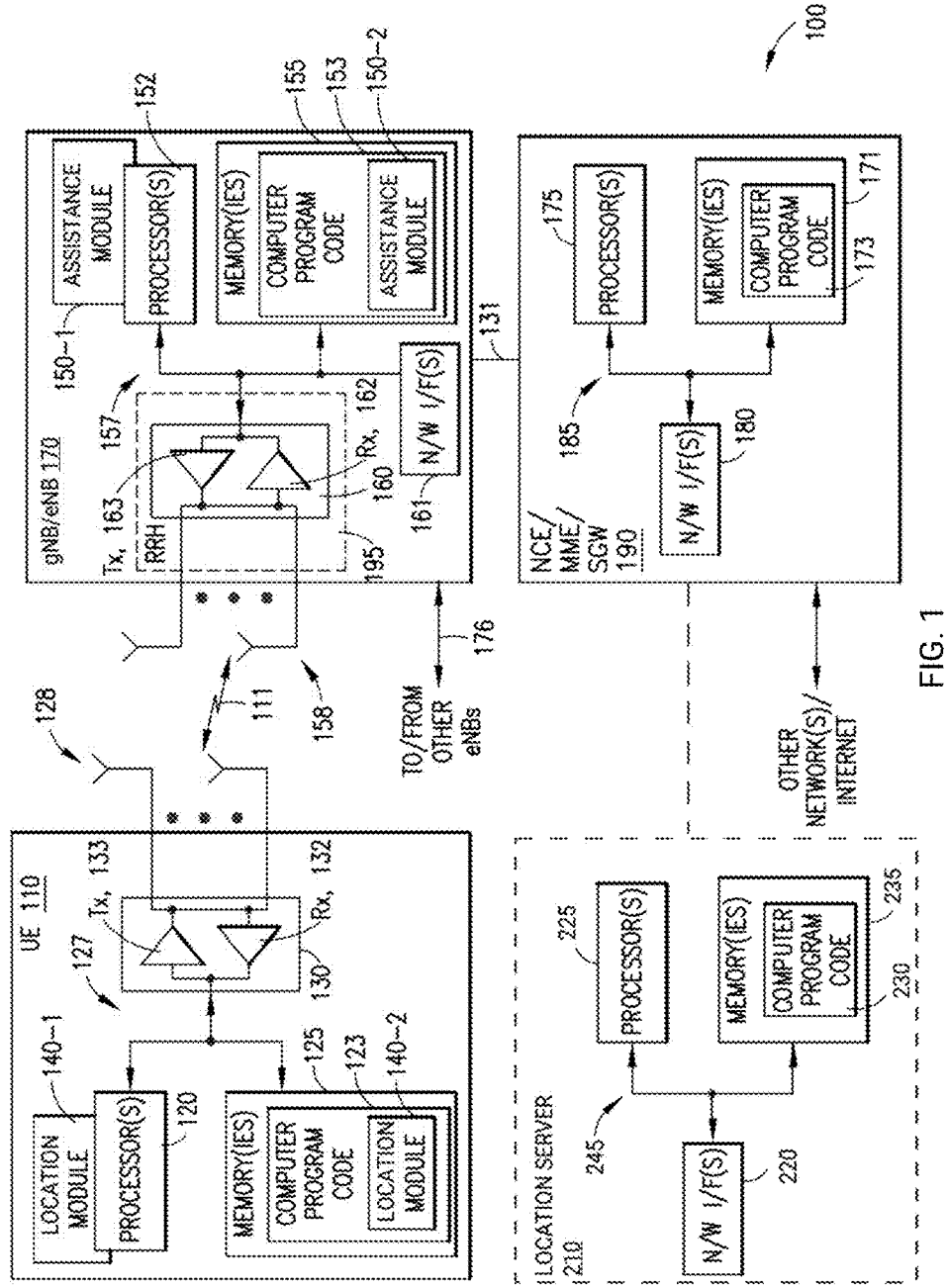
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a location module, comprising one of or both parts 140-1 and/or 140-2, which may be implemented in a number of ways. The location module may be implemented in hardware as location module 140-1, such as being implemented as part of the one or more processors 120. The location module 140-1 may be implemented also as an integrated circuit or through other hardware such as a programmable gate array. In another example, the location module may be implemented as location module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB/gNB (evolved NodeB/5th generation Node B) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes assistance module, comprising one of or both parts 150-1 and/or 150-2, which may be implemented in a number of ways. The assistance module may be implemented in hardware as assistance module 150-1, such as being implemented as part of the one or more processors 152. The assistance module 150-1 may be implemented also as an integrated circuit or through other hardware such as a programmable gate array. In another example, the assistance module may be implemented as assistance module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells.

The wireless network 100 may include one or more network control elements (NCE) 190 that may include MME (Mobility Management Entity) and/or SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may also include a location server for executing different positioning methods for one or more user equipments, such as OTDOA and GPS for example. The location server may be a physical or a logical entity (e.g., E-SMLC or SLP). In some examples, the location server may be collocated with NCE 190. In other example, the location server may be a separate element such as shown in FIG. 1 by location server 210. In FIG. 1, the location server 210 includes one or more processors 225, one or more memories 235, and one or more network interfaces (N/W I/F(s)) 220, interconnected through one or more buses 245. The one or more memories 235 include computer program code 230. The one or more memories 230 and the computer program code 235 are configured to, with the one or more processors 225, cause the location server 210 to perform one or more operations. Further information may also be found 3GPP TS 36.355.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152, 225 or 175 and memories 155, 235 or 171, and also such virtualized entities create technical effects.

The computer readable memories 125, 155, 171, and 235 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, 171, 235 may be means for performing storage functions. The processors 120, 152, 175, and 225 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, 175, and 225 may be means for performing functions, such as controlling the UE 110, eNB 170, location server 210 and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2B:
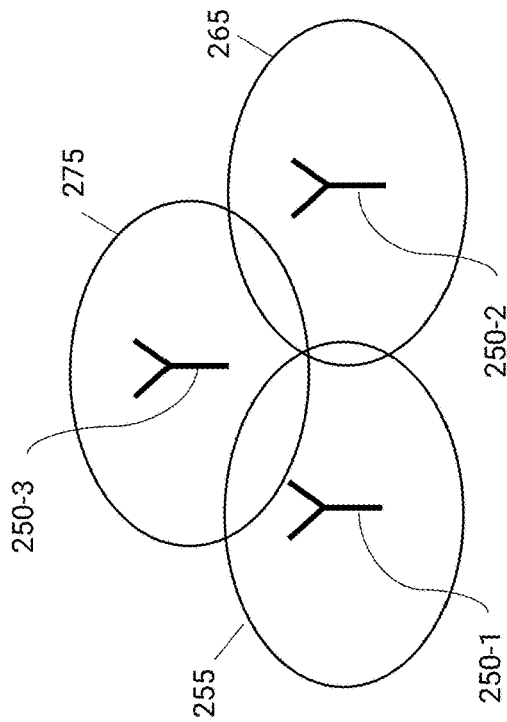
FIG. 2B is a diagram showing an example distributed antenna system (DAS).
Figure 2A:
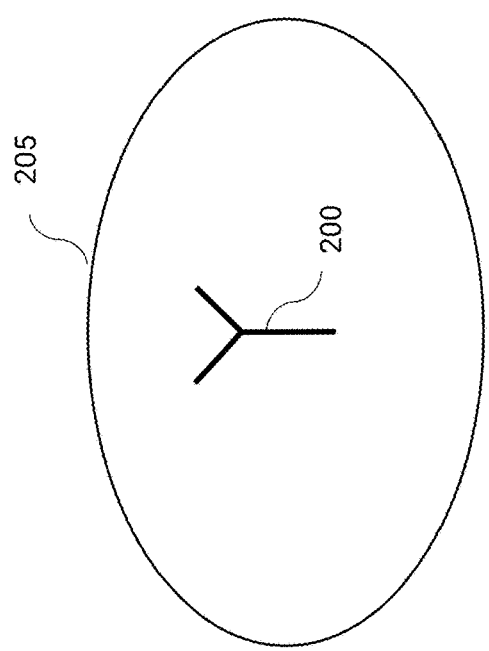
FIG. 2A is a diagram showing an example single antenna system.

FIGS. 2A and 2B show an example single antenna system and a distributed antenna system, respectively. In particular, FIG. 2A includes a single antenna 200 which for providing wireless coverage to a cell 205. Antenna 200 may be collocated with a base station such as eNB 170 for example. FIG. 2B shows a distributed antenna system comprising three antennas 250-1, 250-2, 250-3. Generally, these antennas may are less powerful than the ones used in single antenna systems, although there could be a combination of antennas of varying power. The antennas 250-1, 250-2, 250-3 provide coverage areas 255, 265, 275 which collectively form a cell that provides similar coverage to cell 205 for example. One or more of the antennas 250-1, 250-2, 250-3 may be collocated or physically separate from a base station such as eNB 170 for example.

Having thus introduced one suitable but non-limiting technical context for the practice of the exemplary embodiments of this invention, the exemplary embodiments will now be described with greater specificity.

Typically, during an emergency call, a mobile device may request location assistance from the network operator. For an LTE network, a UE may advertise that it supports OTDOA. A location server may then generate OTDOA assistance data (AD) for the mobile device.

For example, in downlink (DL) OTDOA a UE performs DL Reference Signal Time Difference (RSTD) measurements using the Positioning Reference Signal (PRS) transmitted by the base stations. The PRS transmission from the base station is typically used for the UE to hear the reference and neighbor base stations. For OTDOA, the UE first acquires the reference cell and a list of neighbor cells as assistance data (AD) from the location server so that it can perform the RSTD measurements. Typically, the location server is responsible for selection of the reference cell and neighbor cells to provide the AD to the UE. The location server can provide the AD to the UE or the UE may request and receive the assistance data from the location server. The location server provides the AD to the UE during a location request. The location request may initiate from the network or from the UE. In either case, the AD and RSTD measurements are handled the same.

When the UE is using a serving cell such as a DAS or Repeater, the serving cell cannot be used for any OTDOA measurements. Some of these reasons that the OTDOA measurement are unsuitable include:

1. Location information of the serving cell is invalid. That is, antenna position information is coarse and there is no way to determine the actual antenna location that is used by the UE.
2. The serving cell may not support PRS, namely, the cell cannot be measured for use in location determination.
3. The serving cell may have some large delay spread and any PRS measurement would include a large unknown delay offset.

Regardless of why the serving cell is unusable, the UE may attach to a cell that is not useful for location. Currently, a location server can specify another reference cell, however, the UE may benefit if the original serving cell PCI is included in the assistance data (for example, as a neighbor). This is where a problem occurs. The UE is free to choose any neighbor as a replacement for the reference cell. This may occur if the UE hears another cell having a same PCI that is better than the original reference cell. Since the location server knows that the serving cell is unsuitable, then any RSTD measurements associated with the serving cell PCI are not usable.

In LTE, a PCI (physical cell identity) has a range of 0 to 503 and is used to scramble the data to help a UE separate information from different transmitters. Although the description below refers to LTE, similar techniques are used in other wireless systems.

When a UE hears a PCI, it is possible that there are two cells that have this same PCI number but these two cells may be separated by some distance. For normal wireless options, such as voice or data, the distance between two cells having the same PCI is far enough to function properly. However, during location measurements, it is possible that the UE is supposed to perform a measurement of a first cell, and instead performs a measurement of a different cell having the same PCI as the first cell. In this situation, the RSTD provided by the UE would appear as a large error because the location server assumes the measurements corresponds to the antenna location of the first cell.

In a dense urban environment, there can be 1000s of cells in a given area to support the subscribers, and thus, at some point the same PCI number has to be re-used. The re-use of PCIs is managed by some network planning function to minimize cell interference.

It has been observed during live testing that, on occasion, the location server places the serving cell into the neighbor list. As noted above, including the serving cell PCI into the neighbor list of the AD can help the UE improve search time for RSTD, however, the UE may replace the reference cell specified with the serving cell PCI. This causes a conflict as the UE is aided with knowledge of the serving cell PCI, but the location server also has knowledge that the same PCI is not useable for location. Thus, there is a need to alert the UE that a given PCI should not be used for PRS measurements, including use as a reference.

Another problem is that PCIs are not unique. When the location server provides AD, the main identifier used by the UE is the PCI. The current specification provides a cell identification at the level of global cell ID with the PCI. However, the UE does not use the global cell ID when scanning for the PRS. This leads to PCI ambiguity conditions. That is, the neighbor cell that is requested by the location server is not the cell that the UE hears. To help avoid this condition, the specification provides expected RSTD and expected RSTD uncertainty. However, when the serving cell is a DAS or other cell that leads to a large uncertainty, then the location server has a very large RSTD uncertainty which increases the probability the UE will measure the wrong PCI. Accordingly, when a serving cell (the cell the UE attached to) is a DAS or some cell that has a large uncertainty with respect to the actual cell antenna position, then it is not possible for the location server to determine a reasonable initial starting position for generating the AD for the OTDOA procedure.

Example embodiments described herein introduce a new parameter to indicate to a UE that a given PCI is not to be used in PRS measurements, and to aid with locating the correct PCIs. This new parameter may alert the UE that a reference cell is not useable and that a new replacement is required. When a new replacement is required the location server may include new aiding information such that the UE can improve its RSTD measurements.

Typically, the location server guesses the initial position of the UE and then provides the expected RSTD and expected RSTD uncertainty to the UE. The UE uses expected RSTD to estimate a distance to a neighbor cell. That is, if UE has an estimated distance to a reference cell then by adding this range to the expected RSTD yields the expected UE range to the neighbor cell. Once a range is estimated for the neighbor the UE can scan for the neighbor cell at the estimated range with some uncertainty applied. This works well if the expected RSTD is close to the actual RSTD. However, when uncertainty is high the expected RSTD is far away and UE has to scan longer making the expected RSTD less useful.

According to example embodiments, the location server replaces the expected RSTD and expected RSTD uncertainty with 'coarse geometry' to provide spacial information to the UE. Unless stated otherwise, the term 'coarse geometry' as used herein indicates that the location server provides the relative position of base stations (eNBs) based on a "projected coordinate system", such as for example, World Geodetic System 1984 (WGS84). These projected values provide a linear two dimensional spacing, in meters, of the neighbor eNBs with respect to the serving cell. The serving cell is the origin and each neighbor is some X and Y offset [+/−] from the origin. Using this type of data format provides information so that the UE easily calculates neighbor range or distances without the need for UE to perform any projection from longitude/latitude values. This coarse geometry provides insight for the UE to manage how it searches for a reference cell replacement. For example, a UE may select cells from different areas or quadrants until it finds one hearable cell ('hearable' in this sense refers to the ability to detect a cell). If or when a cell is found then UE knows from the spacial information what other cells are near the new reference cell and picks one or more of the neighbor cells to perform the RSTD measurement process. This means there may be other cells in the neighbor list the UE ignores if the cells are too far away from the reference cell. Accordingly, there is no need for UE to calculate the expected RSTD.

Using coarse geometry, the UE may first search for a replacement reference cell assuming some limit on how far the cell is from the UE. Once a replacement is found then the other neighbor cells can be scanned by using an estimated distance as range from reference to neighbor with some uncertainty based on the time of arrival for the reference. For clarity, the following non-limiting example is provided:

Upon receiving the AD, the UE scans the neighbor cells in the neighbor cell list until one is heard. Assume the cell is nearby so that scan space is limited to a range of 1000 meters, for example.

When a cell is found, the cell is selected as the new reference cell and the distance is from the reference cell to all remaining neighbor cells is calculated. The calculation is defined as square root of the sum of the squared differences between neighbor cell X, Y and reference cell X, Y values in the course geometry (i.e., $\sqrt{(X_n-X_r)^2+(Y_n-Y_r)^2}$). This is the 'ordinary' straight-line distance between two points in Euclidean space. The $X_n$ and $Y_n$ corresponds to neighbor cell X and $X_r$ and $Y_r$ corresponds to the reference cell chosen from the neighbor list as the replacement.

The UE then attempts to hear the neighbor cell based on the straight-line distance. The UE search space would start near the straight-line distance and then continue in both directions (longer and shorter) for some uncertainty range such as ½ the straight-line distance.

Figure 3:
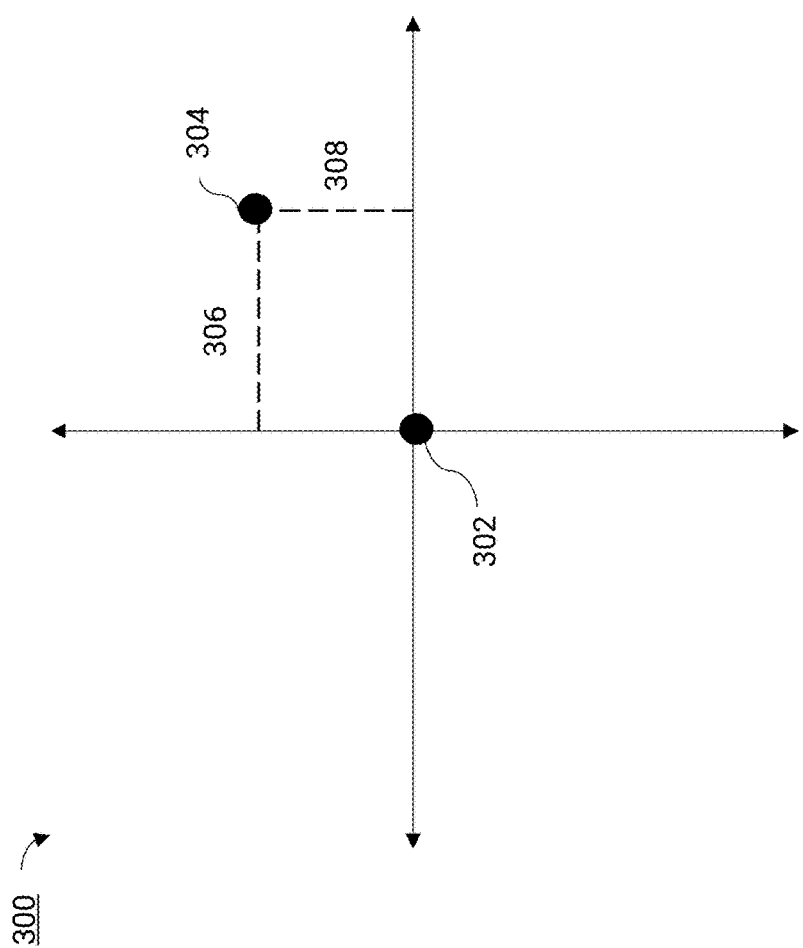
FIG. 3 is an example of a coordinate system in accordance with example embodiments.

FIG. 3 provides an example of a coordinate system 300 in accordance with example embodiments. In this example a serving base station 302 is at the origin of the coordinate system 300 and a neighbor base station is offset in the x-direction by a distance 306, and offset in the y-direction by a distance 308. This is merely an example and it should be understood that there may be more.

When a UE connects to a serving cell and performs the location request, the initial position estimate by the location server may use one or more of the following information when available:

the antenna location (latitude, longitude and altitude);
the antenna orientation when antenna coverage is focused (for example when antenna is directional or is not OMNI);
the antenna opening when antenna orientation is considered;
the UE TA (timing advance) or similar information that indicates how far the UE is from the serving cell at the time of initial connection;
the UE measured Reference Signal Received Power (RSRP, specific to LTE) or similar type of measurement; and
neighbor cells the UE hears in addition to the serving cell when the initial connection is established. Note that these neighbor cells are not necessarily the same as the neighbor cells used later during the OTDOA procedure. The neighbor cells include similar information above as the serving cell.

The initial estimate of the UE is likely good or has low uncertainty when all six of the above example information is available to the location server. This means the initial position guess is likely less than 500 meters from the actual UE position. If the environment is urban, the guess is likely less than 200 meters from the actual UE position.

If the serving cell is OMNI then the location server cannot estimate any direction. So the uncertainty area is larger. If the TA information (coarse distance estimate) is large and the cell is OMNI then the uncertainty area increases. In some examples, high uncertainty could be considered more than 2000 meters from the actual true UE position.

If the serving cell is DAS then the antenna location is suspect and the location server has to fall-back to some agreed parameterized guess for the given uncertainty area. In some examples, this may be 3000 meters of uncertainty.

When the antenna is non-directional (OMNI) or the antenna is DAS or similar, then the assumed area may be circular in shape with a radius of 3000 meters from the assumed antenna position of the serving cell. This area would be very large for urban environments.

According to example embodiments, a location server will estimate an initial position of a UE, and provide coarse geometry to the UE. The initial position estimate of the UE would be the serving cell location when uncertainty is high. The UE then has the X and Y offset for each neighbor cell. The UE would then search for a reference cell replacement from the list of neighbors. The UE has the neighbor position and would scan each neighbor until one is found (bearable). Once a reference cell is found then UE has the X/Y information for the other neighbors and would choose the neighbors that are near or in favorable alignment to the new reference cell. It is noted that that there is no requirement that the UE calculates an expected RSTD. It is assumed that the UE measures time of arrival for the reference cell and neighbor cells. The UE does not directly measure RSTD rather it generates the RSTD measurements from time of arrival measurements.

The current message element for expected RSTD and expected RSTD uncertainty has an encoded value in T3 resolution. This means that each unit of the data element has an accuracy of ~30 meters. This encoded value is proposed as the coarse geometry, and a better resolution can be used. The coarse geometry may be based on the serving cell being at the origin. Each neighbor will have a coarse X offset and Y offset in units like the expected RSTD. In this way, when the UE searches for a reference cell replacement, and when one PCI is found to be hearable, then the UE has the coarse geometry to determine the best search ranges for the remaining neighbor cells.

The location server may specify a wide coverage in the AD without concern for the UE's ability to search for PRS, as the UE is provided with coarse geometry to aid the UE in searching for the reference replacement. In an example embodiment, the UE may use the coarse geometry to partition the neighbor cells into groups, and then search for one PCI in each group. This way, when a PCI is found to be hearable then that group likely contains "nearby" neighbors that will be hearable.

A non-limiting example of a UE algorithm is as follows:
Cluster neighbor cells. Assume for this example to use a K-Means cluster. Generate K-Means cluster from neighbor list. K=4 would mean 4 clusters. Each cluster would have a mean location (X, Y) location and all neighbors would be assigned a cluster number (1 to 4 in this example).
Search for hearable cells by cluster. Choose one cell from each of the 4 clusters. If one or more cells are hearable then choose the one and assign this cell as the reference cell. The remaining neighbors are selected from the same cluster and scanned for PRS. Continue to other clusters if time permits. It is noted that when the uncertainty is high then the neighbor list must cover a wider area. The location server could perform a K-Means cluster sort on behalf of the UE such that the UE can then search in sequential order. For example, the location server generates K-Means cluster using 4 as the cluster size. The neighbor cells are assigned cluster 1-4. Location server then generates AD in cluster order as in 1, 2, 3, 4, 1, 2, 3, 4 . . . such that the UE can search sequentially.
Perform measurements. Once a reference cell replacement is found by the UE then all the neighbor cells that are near the reference cell can be measured first.

When the serving cell uncertainty is high, then it does not make sense for the location server to choose a reference cell. In rare cases, use of network measurements (for example, RSRP from neighbors reported during the connection to the serving cell) may allow the location server to choose a good reference but this is rare because network measurements only provide a PCI value and the location server must look for cells with same PCIs that fit the current scenario. Since the location uncertainty of the serving cell is high, the PCIs near the serving cell may not be the correct choice. According to example embodiments, the location server does not pick a replacement for the reference cell and instead specifies the serving cell as the reference cell and provides coarse geometry for a wide selection of neighbor cells.

According to an example embodiment, a new flag is added to the reference cell information element (IE). The following description refers to this new flag as a 'do_not_use parameter' but this should not be seen as limiting and other names are also possible. Two new parameters for coarse geometry are also added to each of the reference cell IE and to the neighbor cell IEs. When the reference cell IE includes the do_not_use parameter and the do_not_use parameter is set to '1', then the UE will ignore the PCI for any measurements and search for a replacement PCI. The replacement PCI will be selected from one of the neighbor cells. The neighbor cell IEs include coarse geometry parameters, which may indicate a coarse offset relative to the reference cell as specified by the location server (that is, the serving cell). A UE can then cluster the neighbor cells into groups and search for a new reference cell. If the UE hears a PCI that meets its criteria for a new reference cell, then the values of the coarse geometry parameters are used to pick neighbor cells that are likely to be hearable based on distance and orientation from other cells. For example, a first neighbor cell may be picked (neighbor 1), and its orientation from the reference cell may be determined. If there exists another neighbor (neighbor 2), with similar orientation from the reference cell and farther away than neighbor 1, then, according to some embodiments, the two neighbors are not geographically diverse enough and another neighbor with a different orientation may be better. The OTDOA position calculation is strengthened when the neighbor measurements cover a diverse area. This is related to the concept of GDOP (Dilution of precision, or geometric dilution of precision), which means that any errors present in the measurements are inflated depending on the diversity the neighbor positions.

The criteria utilized by the UE when deciding to choose a reference cell from the neighbor list may be based on, for example, energy of the signal, time of arrival, consistence of PRS hearability, etc. Using coarse geometry provides more information for the UE to measure the PCI and can help avoid ambiguous measurements.

According to example embodiment, the do_not_use parameter may be set to '0' to indicate that the serving cell is a valid PRS capable cell and if UE decides to change reference cells, then the coarse geometry can be used to prioritize the search for neighbor cells that are near the new reference cell. The reference cell IE 400 includes location server initial position estimate in the coarse_X_UE_Offset and coarse_Y_UE_Offset fields. These fields can be used by the UE to calculate expected RSTD if needed.

Referring now to FIG. 4 and FIG. 5. These figures provide an example format of a reference cell IE and an example format of a neighbor cell IE, respectively, in accordance with example embodiments. The reference cell IE 400 in FIG. 4 utilizes a do_not_use parameter to alert a UE to search for a replacement cell. In particular, the reference cell IE 400 shown in FIG. 4 is a modified OTDOA-ReferenceCellInfo message. The bolded text in FIG. 4 indicates the changes in the format from a typical OTDOA-ReferenceCellInfo message. In this example, the do_not_use parameter may be set to either '1' or '0'. The reference cell IE 400 also includes two 'coarse geometry' parameters, which in FIG. 4, are named coarse_X_UE_Offset and coarse_Y_UE_Offset. The coarse geometry parameters are indicative of the geographic position of the UE relative to the geographic position of the reference cell (for example, as described above with reference to FIG. 3). It is noted that the do_not_use parameter may be defined in a wireless standard.

According to an example embodiment, the location server may use the location of the serving cell as the initial position estimate of the UE when uncertainty is high. In this situation, the do_not_use parameter is set to '1' and to indicate that the coarse_X_UE_Offset and coarse_Y_UE_Offset are zero. In such embodiments, the coarse_X_UE_Offset and coarse_Y_UE_Offset are not required to be included in the reference cell IE 400. The do_not_use parameter may be set to '0' to indicate that the serving cell is a valid PRS cell and that the initial position is less uncertain. When initial position is less uncertain then the coarse_X_UE_Offset and coarse_Y_UE_Offset are provided to communicate the location server's initial position estimate of the UE. The UE may use this initial estimate to calculate the expected RSTD.

Referring also to FIG. 5, this figure shows an example format of a neighbor cell IE 500 in accordance with example embodiments. The neighbor cell IE 500 includes two coarse geometry parameters (coarse_X_Ref_Offset and coarse_Y_Ref_Offset). These parameters are indicative of the offset of the neighbor cell relative to the reference cell and are included in the neighbor cell IE 500 when the do_not_use parameter is present in the reference cell IE 400.

Although the techniques described herein improve location positioning for cases when the serving cell location has high uncertainty, these techniques may be used for all OTDOA measurements. In an example embodiment, when the reference cell is considered to be 'good', then the do_not_use parameter of reference cell IE 400 is set to '0'. The coarse_X_UE_Offset and coarse_Y_UE_Offset fields are provided. These fields can be linked as a condition for the neighbor lists to also include coarse geometry in the neighbor cell IE 500. When the UE receives coarse geometry, it can better determine if a PCI measured is truly at the location specified by the coarse geometry. The expected RSTD can be calculated given the coarse geometry of the UE and neighbors. When the do_not_use parameter is set to '1' the assumed UE position is the position of the reference cell ID (same as serving cell) and the coarse_X_UE_Offset and coarse_Y_UE_Offset are assumed to be zero. In this case, the UE will search for a replacement reference cell, and the PCI of the serving cell shall not be measured.

In some example embodiments, an additional z-parameter may be included in the neighbor cell IE 500, such as, for example, a coarse_Z_Ref_Offset. The coarse_Z_Ref_Offset may be used to indicate a height difference (for example, in meters) between the reference cell and the neighbor cell. The distance between the reference cell and the neighbor cell can then be calculated as square root of the sum of the squared differences between neighbor cell X, Y, Z and reference cell X, Y, Z values in the course geometry.

In some example embodiments, an additional z-parameter may be included in the reference cell IE 400, such as, for example, a coarse_Z_UE_Offset. The coarse_Z_UE_Offset may be used to indicate a height difference (for example, in meters) between the reference cell and the location server's estimate of the UEs initial position. The coarse_X_UE_Offset, coarse_Y_UE_Offset, and coarse_Z_UE_Offset correspond to the estimated UE position of location server when do_not_use=0.

It is noted that the X, Y, and Z parameters are based on the serving cell as the origin. Accordingly, when the do_not_use parameter is set to '0' then there is no need to replace the 'reference' and the reference X, Y, Z values are all zero (origin). The distance to a given neighbor may be calculated as the square root of the sum of the squared neighbor X, Y, Z terms. When a new reference cell is chosen, one of the neighbors in the neighbor list is picked to be the new reference, which means the coarse_X_Ref_Offset, coarse_Y_Ref_Offset, and coarse_Z_Ref_Offset from both neighbors are used to calculate the distance. For example:

when do_not_use=0, the reference cell X, Y, Z values are zero, and the distance from the reference cell to a given neighbor cell equals: $\sqrt{X^2+Y^2+Z^2}$ where the X, Y, Z values are from the coarse_X_Ref_Offset, coarse_Y_Ref_Offset, coarse_Z_Ref_Offset corresponding to the given neighbor cell; and when do_not_use=1: one neighbor (neighbor 1') from the neighbor list is found and picked as the new reference cell. Distance from the new reference (i.e. neighbor 1) to another neighbor (neighbor 2') is calculated by: $\sqrt{(X_2-X_1)^2+(Y_2-Y_1)^2+(Z_2-Z_1)^2}$ where $X_2$, $Y_2$, and $Z_2$ correspond to neighbor 2, and $X_1$, $Y_1$, and $Z_1$ correspond to neighbor 1.

Encoding rules used for Expected RSTD can be used for these new coarse geometry parameters. As a non-limiting example, assuming a zero meter offset is encoded as 1024 then the following encoding could be used (numbers in parenthesis indicate negative numbers):

| Encoded Value | Meters Offset |
| --- | --- |
| 0 | ~(30,690) |
| ... | ... |
| 1023 | ~(30) |
| 1024 | 0 |
| 1025 | ~30 |
| ... | ... |
| 2047 | ~30,690 |

FIG. 6 is a logic flow diagram for PCI cell restriction and coarse geometry. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the location module 140-1 and/or 140-2 may include multiples ones of the blocks in FIG. 6, where each included block is an interconnected means for performing the function in the block. The blocks in FIG. 6 are assumed to be performed by the UE 110, e.g., under control of the location module 140-1 and/or 140-2 at least in part.

Referring now to FIG. 6, a method is provided including: receiving, by a user equipment connected to a serving cell of a wireless network, assistance data for performing measurements of positioning reference signals, wherein the assistance data comprises reference cell information for a reference cell, and neighbor cell information for one or more neighbor cells as indicated by block 600; in response to determining that the reference cell information comprises an indication that the user equipment is not to measure a positioning reference signal of the reference cell, selecting one of the neighbor cells as a new reference cell as indicated by block 602; and performing measurements of the positioning reference signals based on one or more of the remaining neighbor cells in the assistance data as indicated by block 604. The reference cell information may indicate an estimated position of the user equipment. The neighbor cell information may indicate a position of each of the one or more neighbor cells relative to the serving cell. The estimated position of the user equipment and/or the position of the one or more neighbor cells may be indicated by at least an x-direction offset and a y-direction offset in a two-dimensional coordinate system. The two-dimensional coordinate system may be defined such that the position of the serving cell is at the origin. Selecting one of the neighbor cells as the new reference cell, may include dividing the one or more neighbor cells into at least two groups based on the positions of the one or more neighbor cells; detecting a first neighbor cell in one of the at least two groups that satisfies a reference cell criteria; and selecting the first neighbor cell as the new reference cell. The method may include selecting the remaining neighbor cells of the first group for performing measurements of the positioning reference signals. The reference cell criteria may be based on at least one of: energy of a signal; time of arrival of a signal; and consistency of positioning reference signals received. Performing the measurements of the positioning reference signals may include at least: performing a measurement of the positioning reference signal of the new reference cell, and measurements of each of the one or more remaining neighbor cells, and sending, by the user equipment, a report of the performed measurements to a location server of the wireless network. The reference cell may be a serving cell of the user equipment.

According to another example embodiment, an apparatus is provided including: at least one processor; and at least one non-transitory memory including computer program code, the at least one memory and the computer program code configured to, with the at least one processor, cause the apparatus at least: receive, by a user equipment connected to a serving cell of a wireless network, assistance data for performing measurements of positioning reference signals, wherein the assistance data comprises reference cell information for a reference cell, and neighbor cell information for one or more neighbor cells; in response to determining that the reference cell information comprises an indication that the user equipment is not to measure a positioning reference signal of the reference cell, select one of the neighbor cells as a new reference cell; and perform measurements of the positioning reference signals based on one or more of the remaining neighbor cells in the assistance data. The reference cell information may indicate an estimated position of the user equipment. The neighbor cell information may indicate a position of each of the one or more neighbor cells relative to the serving cell. The estimated position of the user equipment and/or the position of the one or more neighbor cells may be indicated by at least an x-direction offset and a y-direction offset in a two-dimensional coordinate system. The two-dimensional coordinate system may be defined such that the position of the serving cell is at the origin. The selection of one of the neighbor cells as the new reference cell, may comprise: dividing the one or more neighbor cells into at least two groups based on the positions of the one or more neighbor cells; detecting a first neighbor cell in one of the at least two groups that satisfies a reference cell criteria; and selecting the first neighbor cell as the new reference cell. The at least one memory and the computer program code may be configured to, with the at least one processor, cause the apparatus to at least: select the remaining neighbor cells of the first group for performing measurements of the positioning reference signals. The reference cell criteria may be based on at least one of: energy of a signal; time of arrival of a signal; and consistency of positioning reference signals received. Performance of the measurements of the positioning reference signals may comprise at least: performing a measurement of the positioning reference signal of the new reference cell, and measurements of each of the one or more remaining neighbor cells, and sending, by the user equipment, a report of the performed measurements to a location server of the wireless network. The reference cell may be a serving cell of the user equipment.

According to another example embodiment, a computer program product is provided including a non-transitory computer-readable medium bearing computer program code embodied therein, the computer program code executable by a computer to cause the computer to at least: receive, by a user equipment connected to a serving cell of a wireless network, assistance data for performing measurements of positioning reference signals, wherein the assistance data comprises reference cell information for a reference cell, and neighbor cell information for one or more neighbor cells; in response to determining that the reference cell information comprises an indication that the user equipment is not to measure a positioning reference signal of the reference cell, select one of the neighbor cells as a new reference cell; and perform measurements of the positioning reference signals based on one or more of the remaining neighbor cells in the assistance data. The reference cell information may indicate an estimated position of the user equipment. The neighbor cell information may indicate a position of each of the one or more neighbor cells relative to the serving cell. The estimated position of the user equipment and/or the position of the one or more neighbor cells may be indicated by at least an x-direction offset and a y-direction offset in a two-dimensional coordinate system. The two-dimensional coordinate system may be defined such that the position of the serving cell is at the origin. The selection of one of the neighbor cells as the new reference cell, may comprise: dividing the one or more neighbor cells into at least two groups based on the positions of the one or more neighbor cells; detecting a first neighbor cell in one of the at least two groups that satisfies a reference cell criteria; and selecting the first neighbor cell as the new reference cell. The computer program code executable by the computer may cause the computer to: select the remaining neighbor cells of the first group for performing measurements of the positioning reference signals. The reference cell criteria may be based on at least one of: energy of a signal; time of arrival of a signal; and consistency of positioning reference signals received. Performance of the measurements of the positioning reference signals may comprise at least: performing a measurement of the positioning reference signal of the new reference cell, and measurements of each of the one or more remaining neighbor cells, and sending, by the user equipment, a report of the performed measurements to a location server of the wireless network. The reference cell may be a serving cell of the user equipment.

According to yet another embodiment, an apparatus is provided including means for receiving, by a user equipment connected to a serving cell of a wireless network, assistance data for performing measurements of positioning reference signals, wherein the assistance data comprises reference cell information for a reference cell, and neighbor cell information for one or more neighbor cells; in response to determining that the reference cell information comprises an indication that the user equipment is not to measure a positioning reference signal of the reference cell, means for selecting one of the neighbor cells as a new reference cell; and means for performing measurements of the positioning reference signals based on one or more of the remaining neighbor cells in the assistance data.

Figure 7:
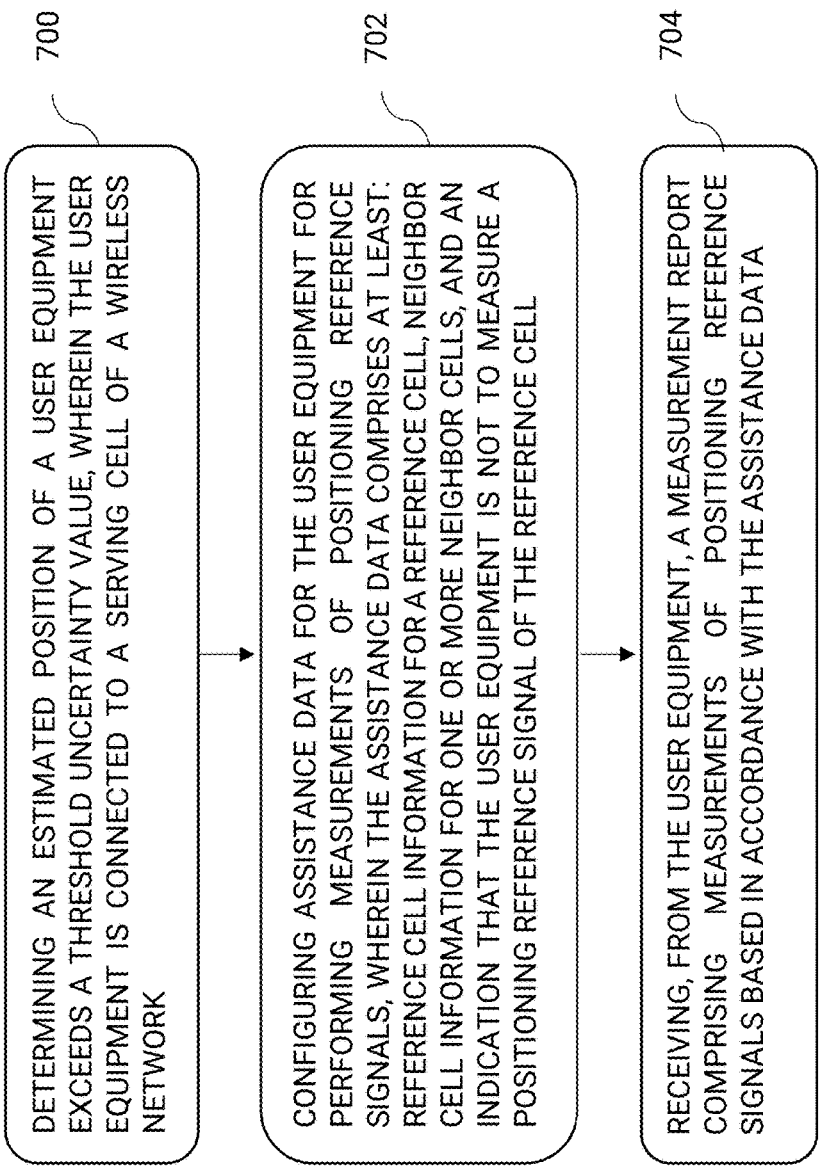

FIG. 7 is a logic flow diagram for is a logic flow diagram for PCI cell restriction and coarse geometry. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the assistance module 150-1 and/or 150-2 may include multiples ones of the blocks in FIG. 7, where each included block is an interconnected means for performing the function in the block. The blocks in FIG. 7 are assumed to be performed by a base station such as eNB 170, e.g., under control of the assistance module 150-1 and/or 150-2 at least in part, and/or a location server such as location server 210.

According to an example embodiment, a method is provided comprising: determining an estimated position of a user equipment exceeds a threshold uncertainty value, wherein the user equipment is connected to a serving cell of a wireless network as indicated by block 700; configuring assistance data for the user equipment for performing measurements of positioning reference signals, wherein the assistance data comprises at least: reference cell information for a reference cell, neighbor cell information for one or more neighbor cells, and an indication that the user equipment is not to measure a positioning reference signal of the reference cell as indicated by block 702; and receiving, from the user equipment, a measurement report comprising measurements of positioning reference signals based in accordance with the assistance data as indicated by block 704. The reference cell information may indicate the estimated position of the user equipment. The neighbor cell information may indicate a position of each of the one or more neighbor cells relative to the serving cell. The estimated position of the user equipment and/or the position of the one or more neighbor cells may be indicated by at least an x-direction offset and a y-direction offset in a two-dimensional coordinate system. The two-dimensional coordinate system may be defined such that the position of the serving cell is at the origin. The measurement report may comprise measurements of positioning reference signals relative to a new reference cell selected by the user equipment from among the neighbor cells, and the measurements may correspond to at least some of the remaining neighbor cells.

According to another example embodiment, an apparatus is provided including: at least one processor; and at least one non-transitory memory including computer program code, the at least one memory and the computer program code configured to, with the at least one processor, cause the apparatus at least: determine an estimated position of a user equipment exceeds a threshold uncertainty value, wherein the user equipment is connected to a serving cell of a wireless network; configure assistance data for the user equipment for performing measurements of positioning reference signals, wherein the assistance data comprises at least: reference cell information for a reference cell, neighbor cell information for one or more neighbor cells, and an indication that the user equipment is not to measure a positioning reference signal of the reference cell; and receive, from the user equipment, a measurement report comprising measurements of positioning reference signals based in accordance with the assistance data. The reference cell information may indicate the estimated position of the user equipment. The neighbor cell information may indicate a position of each of the one or more neighbor cells relative to the serving cell. The estimated position of the user equipment and/or the position of the one or more neighbor cells may be indicated by at least an x-direction offset and a y-direction offset in a two-dimensional coordinate system. The two-dimensional coordinate system may be defined such that the position of the serving cell is at the origin. The measurement report may comprise measurements of positioning reference signals relative to a new reference cell selected by the user equipment from among the neighbor cells, and the measurements may correspond to at least some of the remaining neighbor cells.

According to another example embodiment, a computer program product is provided including a non-transitory computer-readable medium bearing computer program code embodied therein, the computer program code executable by a computer to cause the computer to at least: determine an estimated position of a user equipment exceeds a threshold uncertainty value, wherein the user equipment is connected to a serving cell of a wireless network; configure assistance data for the user equipment for performing measurements of positioning reference signals, wherein the assistance data comprises at least: reference cell information for a reference cell, neighbor cell information for one or more neighbor cells, and an indication that the user equipment is not to measure a positioning reference signal of the reference cell; and receive, from the user equipment, a measurement report comprising measurements of positioning reference signals based in accordance with the assistance data.

According to yet another embodiment, an apparatus is provided including means for determining an estimated position of a user equipment exceeds a threshold uncertainty value, wherein the user equipment is connected to a serving cell of a wireless network; means for configuring assistance data for the user equipment for performing measurements of positioning reference signals, wherein the assistance data comprises at least: reference cell information for a reference cell, neighbor cell information for one or more neighbor cells, and an indication that the user equipment is not to measure a positioning reference signal of the reference cell; and means for receiving, from the user equipment, a measurement report comprising measurements of positioning reference signals based in accordance with the assistance data.

Without in any way limiting the scope, interpretation, or application of the claims appearing below, a technical effect of one or more of the example embodiments disclosed herein is improved OTDOA measurements when the location of a serving cell of a user equipment is uncertain. Another technical effect of one or more of the example embodiments disclosed herein allows a user equipment to easily determine placement of cells to speed up the scan for cells known to be near the UE chosen reference cell.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171, and 235 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
AD Assistance Data
eNB (or eNodeB) evolved Node B (e.g., an LTE base station)
I/F interface
LPP LTE positioning protocol
LTE long term evolution
MME mobility management entity
NCE network control element
N/W network
PCI Physical Cell Identifier
RSRP Reference Signal Received Power
RSTD Reference Signal Time Difference
RRH remote radio head
Rx receiver
SGW serving gateway
Tx transmitter
UE user equipment (e.g., a wireless device)

What is claimed is:

1. A method, comprising:
receiving, by a user equipment connected to a serving cell of a wireless network, assistance data for performing measurements of positioning reference signals, wherein the assistance data comprises reference cell information for a reference cell, and neighbor cell information for one or more neighbor cells;
in response to determining that the reference cell information comprises an indication that the user equipment is not to measure a positioning reference signal of the reference cell, selecting one of the neighbor cells as a new reference cell; and
performing measurements of the positioning reference signals based on one or more of the remaining neighbor cells in the assistance data.

2. The method as in claim 1, wherein:
the reference cell information indicates an estimated position of the user equipment; and
the neighbor cell information indicates a position of each of the one or more neighbor cells relative to the serving cell.

3. The method as in claim 2, the estimated position of the user equipment and/or the position of the one or more neighbor cells is indicated by at least an x-direction offset and a y-direction offset from the serving cell in a two-dimensional coordinate system.

4. The method as in claim 3, wherein the two-dimensional coordinate system is defined such that the position of the serving cell is at the origin.

5. The method as in claim 2, wherein selecting one of the neighbor cells as the new reference cell, comprises:
dividing the one or more neighbor cells into at least two groups based on the positions of the one or more neighbor cells;
detecting a first neighbor cell in one of the at least two groups that satisfies a reference cell criteria; and
selecting the first neighbor cell as the new reference cell.

6. The method as in claim 5, further comprising:
selecting the remaining neighbor cells of the first group for performing measurements of the positioning reference signals.

7. The method as in claim 5, wherein the reference cell criteria is based on at least one of:
energy of a signal;
time of arrival of a signal; and
consistency of positioning reference signals received.

8. The method as in claim 1, wherein performing the measurements of the positioning reference signals comprises at least:
performing a measurement of the positioning reference signal of the new reference cell, and measurements of each of the one or more remaining neighbor cells, and
sending, by the user equipment, a report of the performed measurements to a location server of the wireless network.

9. The method as in claim 1, wherein the reference cell is a serving cell of the user equipment.

10. An apparatus comprising:
at least one processor; and
at least one non-transitory memory including computer program code, the at least one memory and the computer program code configured to, with the at least one processor, cause the apparatus at least to:
receive, by a user equipment connected to a serving cell of a wireless network, assistance data for performing measurements of positioning reference signals, wherein the assistance data comprises reference cell information for a reference cell, and neighbor cell information for one or more neighbor cells;
in response to determining that the reference cell information comprises an indication that the user equipment is not to measure a positioning reference signal of the reference cell, select one of the neighbor cells as a new reference cell; and
perform measurements of the positioning reference signals based on one or more of the remaining neighbor cells in the assistance data.

11. The apparatus as in claim 10, wherein at least one of:
the reference cell information indicates an estimated position of the user equipment; and the neighbor cell information indicates a position of each of the one or more neighbor cells relative to the serving cell.

12. The apparatus as in claim 11, wherein the estimated position of the user equipment and/or the position of the one or more neighbor cells is indicated by at least an x-direction offset and a y-direction offset from the serving cell in a two-dimensional coordinate system.

13. The apparatus as in claim 12, wherein the two-dimensional coordinate system is defined such that the position of the serving cell is at the origin.

14. The apparatus as in claim 11, wherein selection of one of the neighbor cells as the new reference cell, comprises:
dividing the one or more neighbor cells into at least two groups based on the positions of the one or more neighbor cells;
detecting a first neighbor cell in one of the at least two groups that satisfies a reference cell criteria; and
selecting the first neighbor cell as the new reference cell.

15. The apparatus as in claim 14, wherein the at least one memory and the computer program code are configured to, with the at least one processor, cause the apparatus to at least:
select the remaining neighbor cells of the first group for performing measurements of the positioning reference signals.

16. The apparatus as in claim 14, wherein the reference cell criteria is based on at least one of:
energy of a signal;
time of arrival of a signal; and
consistency of positioning reference signals received.

17. The apparatus as in claim 10, wherein performance of the measurements of the positioning reference signals comprises at least:
performing a measurement of the positioning reference signal of the new reference cell, and measurements of each of the one or more remaining neighbor cells, and
sending, by the user equipment, a report of the performed measurements to a location server of the wireless network.

18. The apparatus as in claim 10, wherein the reference cell is a serving cell of the user equipment.

19. A computer program product comprising a non-transitory computer-readable medium bearing computer program code embodied therein, the computer program code executable by a computer to cause the computer to at least:
receive, by a user equipment connected to a serving cell of a wireless network, assistance data for performing measurements of positioning reference signals, wherein the assistance data comprises reference cell information for a reference cell, and neighbor cell information for one or more neighbor cells;
in response to determining that the reference cell information comprises an indication that the user equipment is not to measure a positioning reference signal of the reference cell, select one of the neighbor cells as a new reference cell; and
perform measurements of the positioning reference signals based on one or more of the remaining neighbor cells in the assistance data.

20. The computer program product as in claim 19, wherein, at least one of:
the reference cell information indicates an estimated position of the user equipment; and
the neighbor cell information indicates a position of each of the one or more neighbor cells relative to the serving cell.

* * * * *